(12) United States Patent
Li

(10) Patent No.: US 9,252,837 B1
(45) Date of Patent: Feb. 2, 2016

(54) SPLIT DIVERSITY DATA COMBINING

(71) Applicant: NXP B.V., Eindhoven (NL)

(72) Inventor: Hong Li, Eindhoven (NL)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/453,309

(22) Filed: Aug. 6, 2014

(51) Int. Cl.
| H04B 1/7115 | (2011.01) |
| H04B 7/04 | (2006.01) |
| H04B 7/02 | (2006.01) |
| H04L 27/26 | (2006.01) |

(52) U.S. Cl.
CPC .............. *H04B 1/7115* (2013.01); *H04B 7/022* (2013.01); *H04B 7/0413* (2013.01); *H04L 27/2647* (2013.01)

(58) Field of Classification Search
CPC ........ H04B 1/40; H04L 1/06; H04L 27/2647; H01Q 1/1271; H04W 16/28
See application file for complete search history.

(56) References Cited

U.S. PATENT DOCUMENTS

| 7,035,323 | B1* | 4/2006 | Arato et al. .................... | 375/222 |
| 9,071,326 | B2 | 6/2015 | Koppelaar et al. | |
| 2005/0163039 | A1* | 7/2005 | Narayan et al. ............... | 370/204 |
| 2005/0243756 | A1 | 11/2005 | Cleveland et al. | |
| 2007/0047678 | A1* | 3/2007 | Sibecas et al. ................. | 375/343 |
| 2008/0285533 | A1 | 11/2008 | Bengtsson et al. | |
| 2009/0170455 | A1 | 7/2009 | Bowen et al. | |
| 2010/0062802 | A1 | 3/2010 | Amram | |
| 2012/0231739 | A1 | 9/2012 | Chen | |
| 2014/0148093 | A1 | 5/2014 | Nguyen et al. | |

FOREIGN PATENT DOCUMENTS

EP 2822186 A1 1/2015

OTHER PUBLICATIONS

S. Serbetli, "Doppler Compensation for Mobile OFDM Systems with Mulitiple Receive Antennas", IEEE 19th Symposium on Communications and Vehicular Technology in the Benelux ( SCVT), 2008, 1499-1503.

Young, et al., Study for various array antenna assisted Doppler spread compensator with MRC diversity of ISDB-T receiver., 2006, 2947-2951.

Extended European Search Report for Patent Appln. No. 1517926.1 (Nov. 10, 2015).

* cited by examiner

Primary Examiner — Leon-Viet Nguyen

(57) ABSTRACT

Various exemplary embodiments relate to a wireless communications system, communications device related methods, and automotive and other vehicles including: an antenna group comprising at least one antenna; a receiver circuit configured to receive a first instance of a data symbol via the antenna group; a first swap component configured to: receive a first portion of a second instance of the data symbol from the second communications device, provide a second portion of the first instance of the data symbol to a second communications device; and a buffer configured to store a first portion of the first instance of the data symbol and the first portion of the second instance of the data symbol; and a combining processor configured to create a first portion of a combined symbol by combining the first portion of the first instance and the first portion of the second instance.

20 Claims, 5 Drawing Sheets

SPLIT DIVERSITY DATA COMBINING

TECHNICAL FIELD

Various exemplary embodiments disclosed herein relate generally to wireless communications and, more particularly but not exclusively, to wireless communication in intelligent transportation systems (ITS) and car infotainment systems.

BACKGROUND

Intelligent transportation systems (ITS) are emerging for improving road safety by broadcasting real-time information regarding vehicles in the area. According to some ITSs, vehicles set-up a vehicular ad-hoc network (VANET) based on IEEE 802.11p dedicated short-range communications (DSRC) to wirelessly exchange position, speed, road condition, or event/accident information between nearby vehicles. In some applications, such as implementations according to the European Telecommunications Standards Institute (ETSI) ITS standards, vehicles periodically broadcast common awareness messages (CAMs) at a rate of 10 Hz to report information such as current speed and position in the control channel. Radio reception quality is important for such systems and safety-related applications.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a communications device including: a first antenna group including at least one antenna; a first receiver circuit configured to receive a first instance of a data symbol via the first antenna group; a first swap component configured to: receive a first portion of a second instance of the data symbol from the second communications device, provide a second portion of the first instance of the data symbol to a second communications device; and a first buffer configured to store a first portion of the first instance of the data symbol and the first portion of the second instance of the data symbol; and a first combining processor configured to create a first portion of a combined symbol by combining the first portion of the first instance of the data symbol and the first portion of the second instance of the data symbol.

Various embodiments described herein relate to a method for receiving a wireless signal, the method including: receiving, at a first communications device via a wireless communication medium, a first instance of a data symbol, the first instance including a first portion and a second portion; providing, by the first communications device to a second communications device, the second portion of the first instance; receiving, by the first communications device from the second communications device, a first portion of a second instance of the data symbol; combining the first portion of the first instance with the first portion of the second instance to create a first portion of a combined symbol.

Various embodiments described herein relate to a non-transitory machine-readable storage medium encoded with instructions for execution by a first communications device for receiving a wireless signal, the method comprising: instructions for receiving, at the first communications device via a wireless communication medium, a first instance of a data symbol, the first instance including a first portion and a second portion; instructions for providing, by the first communications device to a second communications device, the second portion of the first instance; instructions for receiving, by the first communications device from the second communications device, a first portion of a second instance of the data symbol; instructions for combining the first portion of the first instance with the first portion of the second instance to create a first portion of a combined symbol.

Various embodiments are described wherein the swap component includes: a transmitter circuit configured to transmit the second portion of the first instance of the data symbol via the first antenna group, and the first receiver circuit, wherein the first receiver circuit is configured to receive the first portion of a second instance of the data symbol via the first antenna group.

Various embodiments are described wherein the swap component includes a wired connection to the second communications device.

Various embodiments are described wherein the data symbol is an orthogonal frequency division multiplexing (OFDM) symbol.

Various embodiments are described wherein: the first swap component is further configured to: provide a third portion of the first instance of the data symbol to a third communications device, and receive a first portion of a third instance of the data symbol from the third communications device; the first buffer is further configured to store the first portion of the third instance of the data symbol; and in creating the first portion of a combined symbol, the first combining processor is configured to combine the first portion of the first instance of the data symbol, the first portion of the second instance of the data symbol, and the first portion of the third instance of the data symbol.

Various embodiments are described wherein: the first portion of the first instance of the data symbol includes at least a first subcarrier of the first instance of the data symbol, the second portion of the first instance of the data symbol includes at least a second subcarrier of the first instance of the data symbol, the first portion of the second instance of the data symbol includes at least a first subcarrier of the second instance of the data symbol, and the second portion of the second instance of the data symbol includes at least a second subcarrier of the second instance of the data symbol.

Various embodiments are described wherein the combining processor is further configured to transmit a control message to the second communications device, wherein the control message indicates that the communications device will transmit the first portion of the first instance of the data symbol to the second communications device and will process the second portion of the first instance of the data symbol.

Various embodiments are described wherein the swap component is further configured to receive a second portion of the combined symbol from the second communications device, the communications device further including: a decoder configured to decode the first and second portions of the combined symbol.

Various embodiments described herein relate to a communications system additionally including the second communications device, wherein the second communications device includes: a second antenna group including at least one antenna; a second receiver circuit configured to receive the instance of the data symbol via the second antenna group; a second swap component configured to: provide the first portion of the second instance of the data symbol to the communications device, and receive the second portion of a first instance of the data symbol from the communications device; a second buffer configured to store a second portion of the second instance of the data symbol and the second portion of the first instance of the data symbol; and a second combining processor configured to create a second portion of the combined symbol by combining the second portion of the first instance of the data symbol and the second portion of the second instance of the data symbol.

Various embodiments additionally include a third communications device configured to receive a third instance of the data symbol and a fourth communications device configured to receive a fourth instance of the data symbol, wherein: the first swap component is further configured to receive a first portion of a first intermediate combined symbol from the third communications device; the second swap component is further configured to receive a second portion of the first intermediate combined symbol from the fourth communications device; the first portion of the combined symbol is a first portion of a second intermediate combined symbol; the second portion of the combined symbol is a second portion of the second intermediate combined symbol; the first combining processor is further configured to create a first portion of a fully combined symbol by combining the first portion of the first intermediate combined symbol and the first portion of the second intermediate combined symbol; and the second combining processor is further configured to create a second portion of the fully combined symbol by combining the second portion of the first intermediate combined symbol and the second portion of the second intermediate combined symbol.

Various embodiments additionally include third communications device configured to receive a third instance of the data symbol and a fourth communications device configured to receive a fourth instance of the data symbol, wherein: the first portion of the combined symbol is a first portion of a first intermediate combined symbol, wherein the first portion of the first intermediate combined symbol includes a first sub-portion of the first intermediate combined symbol and a second sub-portion of the first intermediate combined symbol; the second portion of the combined symbol is a second portion of the first intermediate combined symbol wherein the second portion of the first intermediate combined symbol includes a third sub-portion of the first intermediate combined symbol and a fourth sub-portion of the first intermediate combined symbol; the first swap component of the first communications device is further configured to: provide the second sub-portion of the first intermediate combined symbol to the third communications device, and receive a first sub-portion of a second intermediate combined symbol from the third communications device; the second swap component of the second communications device is further configured to: provide the fourth sub-portion of the first intermediate combined symbol to the fourth communications device, and receive a third sub-portion of the second intermediate combined symbol from the fourth communications device; the first combining processor is further configured to create a first sub-portion of a fully combined symbol by combining the first sub-portion of the first intermediate combined symbol and the first sub-portion of the second intermediate combined symbol; and the second combining processor is further configured to create a third sub-portion of the fully combined symbol by combining the third sub-portion of the first intermediate combined symbol and the third sub-portion of the second intermediate combined symbol.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
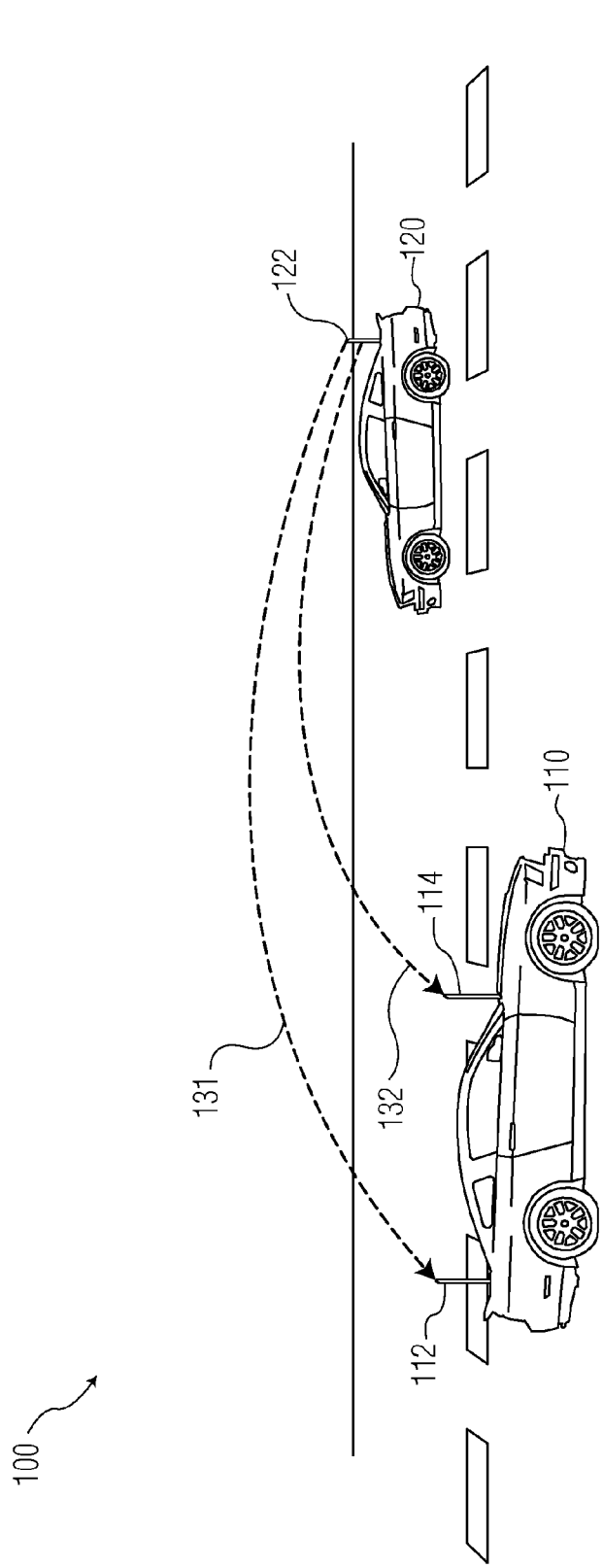
FIG. 1 illustrates an exemplary intelligent transportation system (ITS) environment for implementation of cooperative antenna diversity.

In highly mobile environments, such as digital car radio, TV, and ITS environments, radio reception quality can drop drastically at times due to effects such as Doppler spreading on a multi-path fading signal. Diversity techniques, such as antenna diversity, may be employed to improve radio reception quality in the case of such fading. Antenna diversity, in particular, improves reception quality by combining the signals received from two or more antennas. Effectiveness of this technique can be improved by disposing the multiple antennas sufficiently far apart from each other (e.g., by at least half the carrier wavelength) to provide for independent fading among the antennas. Even further separation is desirable to account for shadowing due to other factors such as a curved car roof. For example, one antenna may be disposed near the front of a vehicle and another antenna may be disposed near the rear of the vehicle.

Combination of signals is performed after the signals have been brought together. For example, in some environments, two antennas and associated transceivers may be in communication with each other via a coaxial cable, wired digital interface, or other wired connection. This duplication of signal data to be processed by the combining device, however, increases the memory and processing capabilities utilized to perform the reception function. As more advanced schemes are employed, such as an advanced algorithm using subcarrier channel changes, the memory and processing load are even higher. This increased hardware requirement for combining signals leads to higher costs in implementing systems utilizing antenna diversity in excess of the base cost of two (or more) multiple-antenna receivers. Accordingly, a method and system for combining antenna diversity signals while not placing an increased hardware requirement on the respective transceivers or other communications devices implementing the antenna diversity scheme would be beneficial.

It will be apparent that various systems and methods described herein may be used to improve reception quality in a variety of applications other than ITS. For example, car infotainment systems, such as digital TV systems which utilize relatively larger symbol sizes (e.g., 8 k subcarriers) may benefit from the improved reception quality in highly mobile environments. Digital car radio systems may similarly benefit. Various additional applications that would benefit from the methods and systems described herein will be apparent, both in the context of vehicle applications and other contexts.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

FIG. 1 illustrates an exemplary intelligent transportation system (ITS) environment 100 for implementation of cooperative antenna diversity. As shown, the ITS environment 100 includes two vehicles 110, 120 which are provided with a respective wireless communications devices 112, 114, 122 including one or more antenna and circuitry or other hardware for enabling communication between the vehicles 110, 120. It will be appreciated that fewer or greater number of vehicles may be present in the environment 100 and that diverse vehicles (e.g., cars, trucks, motorcycles, boats, aircraft, etc.) and other devices (e.g., mobile phones, pedestrian devices, roadside beacons, etc.) may participate in the environment 100 according to the various methods described herein.

According to various embodiments, the communications devices 112, 114, 122 periodically broadcast or otherwise exchange information with each other. For example, the communications devices 112, 122 may join a vehicular ad-hoc network (VANET) and periodically broadcast common awareness messages (CAMs) to be received by the other communications devices 112, 122 in the area. Such CAMs may include various information such as, for example, information identifying the current position and speed of the transmitting vehicle. Various additional or alternative messages for transmission between the vehicles 110, 120 will be apparent.

To increase received message quality against the prospect of fading, the first vehicle 110 implements an antenna diversity scheme. To provide antenna diversity, the first vehicle 110 includes a rear antenna 112 and a front antenna 114 that are associated with respective transceivers. Alternative antenna arrangements are also possible. As such, when the second vehicle 120 transmits a message, both the rear antenna 112 and the front antenna 114 receive respective copies 131, 132 of the message. Due to the positioning of the antennas 112, 114 of the first vehicle 110, the quality and fidelity of the received messages 131, 132 may vary and, as such, combination of the two messages 131, 132 may result in a better representation of the message as originally transmitted by the second vehicle 120.

The front antenna 114 and rear antenna 112 may both be associated with respective transceivers responsible for combining the messages. For example, as will be explained in greater detail below, the transceiver at the front antenna 114 may combine a portion of a received message while the transceiver at the rear antenna 112 may combine different portions of the received message. For example, after receiving the message 131 at the rear antenna 112 and the message 132 at the front antenna, the respective transceivers may split the messages 131, 132 into multiple parts (e.g., into two different groups of orthogonal frequency division multiplexing (OFDM) subcarriers) and exchange one such part with the other transceiver. The respective transceivers then combine the locally stored message parts to produce a combined message part, which can then be used by another device, such as a decoder or application processor.

Figure 2:
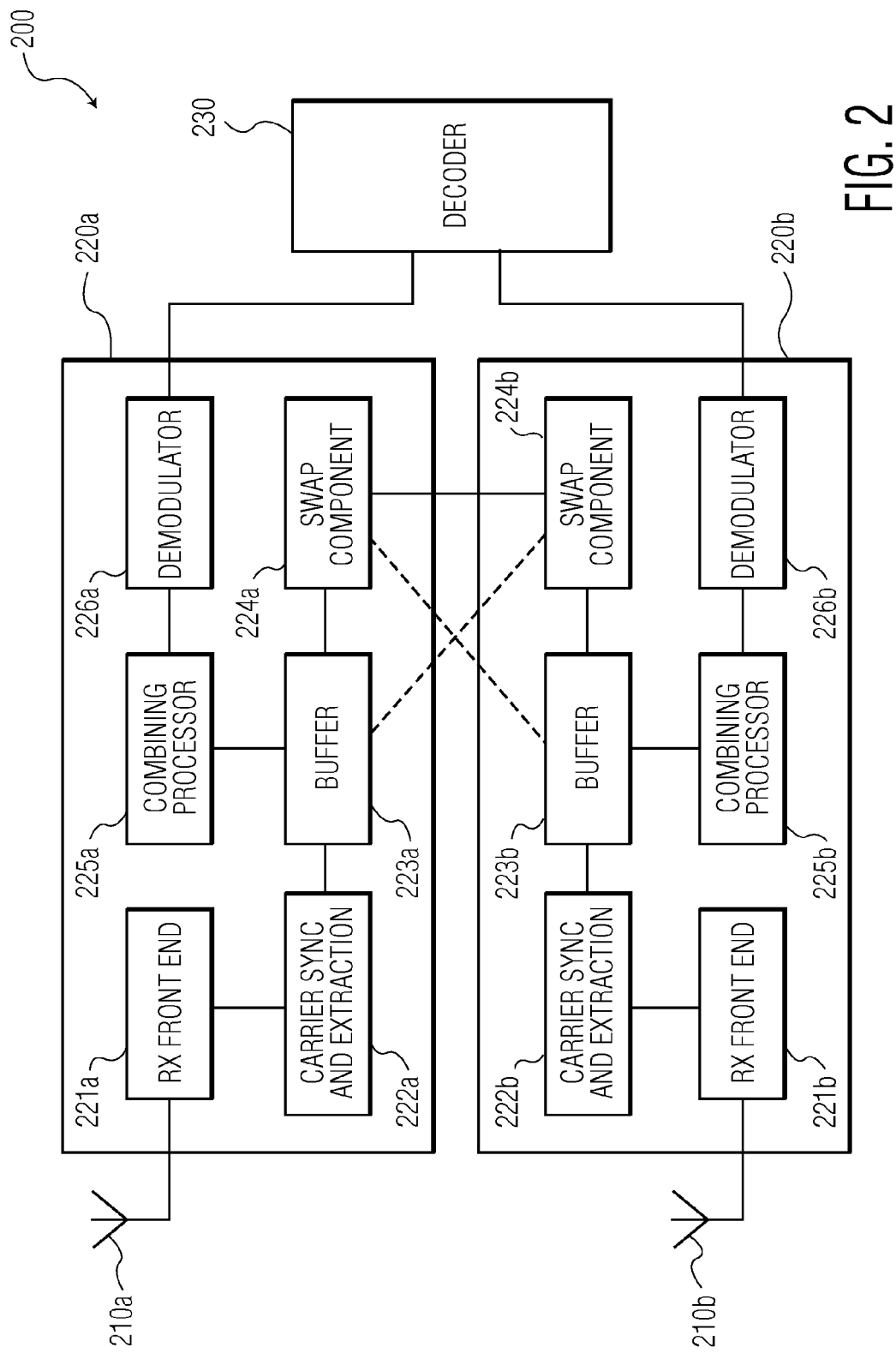
FIG. 2 illustrates a block diagram of an exemplary communications system.

FIG. 2 illustrates a block diagram of an exemplary communications system 200. The communications system 200, for example, includes a pair of antennas 112, 114 and transceivers as installed in the exemplary vehicle 110 of FIG. 1. It will be apparent that various hardware configurations may be used to implement the components of the wireless communications device 200. For example, each component may be a separate circuit or integrated circuit (IC), multiple components may be implemented together as a single IC, or one or more components may be implemented by a microprocessor configured to perform the functions described herein. Various additional modifications will be apparent.

As shown, the system 200 includes two antennas 210a, 210b, two respective transceivers 220a, 220b, and a decoder 230. It will be apparent that the system may include various additional components. For example, the system 200 may include one or more additional antenna and transceiver pairs similar to those illustrated 210a-b, 220a-b. As another example, the system 200 may include a processor or other application component that receives and processes a fully demodulated, decoded, and combined message output by the decoder 230. For example, such a component may implement an ITS application and utilize the received message as a CAM.

The illustrated antennas 210 may be dedicated receiver antennas or may be used for both signal reception and transmission, for example, via an antenna switch (not shown). In other embodiments, each of the antennas 210 may include two or more antennas, with at least one antenna dedicated to the receive path and at least one other antenna dedicated to the transmit path.

In the embodiment shown, signals received by the antenna 210 are provided to a receiver (Rx) radio frequency (RF) front end 220. As will be understood, the Rx RF front end 220 may include various circuitry for receiving messages via the antenna 210. For example, the Rx RF front end 220 may include various amplifiers, filters, mixers, or oscillators configured and arranged to process and communicate signals via the antenna 210. Various options for implementing the Rx RF front end 220 will be apparent to those of skill in the art.

After receiving a signal, the Rx front end 221 passes the signal to carrier synchronization and extraction circuitry 222. Here, the carrier synchronization and extraction circuitry 222 extracts a data symbol from the carrier signal according to any method known to those of skill in the art. For example, the carrier synchronization and extraction circuitry 222 may extract OFDM symbols from the received signal. In various embodiments the carrier synchronization and extraction circuitry 222 also splits the data symbol into multiple parts. For example, where an OFDM symbol is extracted, the carrier synchronization and extraction circuitry 222 may divide the subcarriers among two or more groups, thereby creating OFDM symbol portions for additional processing. Various manners of implementation of this functionality will be apparent. For example, the carrier synchronization and extraction circuitry 222 may use a fast Fourier transform (FFT) to differentiate between the different frequencies used for each subcarrier in the OFDM symbol. After extracting and splitting the data symbol, the carrier synchronization and extraction circuitry 222 stores the data symbol portions in a buffer memory 223.

Next, a swap component 224 operates to swap some of the data symbol portions with other communications devices. As shown in the exemplary embodiment of FIG. 2, one swap component 224a sends a first portion of the received symbol for storage in the buffer 223b of the other communications device 220b. Similarly, the other swap component 224b sends a second portion of the received symbol for storage in the buffer 223a of the first communications device 220a. After the swap, both of the buffers 223 include two versions of the same portion of the data symbol. Various hardware and methods for implementing this swapping functionality will be apparent. For example, the swap components 224 may utilize direct memory access (DMA) via a shared data bus or other digital links to read and write data to the buffers 223 on the other communications device 220. As another example, the swap components 224 may include a digital link such as a serial link therebetween. Using this link, the swap components 224 may swap data symbol portions between each other and then place the received portions in the respective buffers 223. As yet another alternative, instead of using a serial link, the swap components 224 may retransmit the data symbol portions to the opposite communications device 220 wirelessly via a transmit path (not shown). Various methods for implementing such wireless retransmission are described in greater detail in co-pending application Ser. No. 14/445,861, filed on Jul. 29, 2014, entitled "Cooperative Antenna-Diversity Radio Receiver," the entire disclosure of which is incorporated herein for all purposes.

Once the buffer 223 includes two (or more, where the system 200 includes more than two communications devices 220) versions of a data symbol part, a combining processor 225 combines the two (or more) versions to generate a portion of a combined data symbol. The combining processor 225 may utilize virtually any method for combining the data symbol portions such as, for example, maximum ratio, equal ratio, or diversity packet combining. In some embodiments, the combining processor 225 may also perform full or partial demodulation prior to or after combining the data symbol parts. For example, where the symbol parts are differentially encoded quadrature amplitude modulated (DEQAM), the combining processor 225 may demodulate both symbol portions according to QAM (leaving the result in differentially encoded form) prior to combination.

The combining processor 225 may also perform control functions. For example, the combining processors 225 may communicate with each other via control messages to determine which data symbol portion will be transmitted to and combined by each communications device 200. Additionally or alternatively, the combining processors 225 may exchange control messages to reach agreement on where each received data symbol will be split (e.g., which OFDM subcarriers belong to which portion to be assigned to a communications device). Various additional control functionality will be apparent. Such control messages may be exchanged according to any method including any of the communication methods described above as being utilized by the swap components 224.

After the symbol parts are combined, the combining processor 225 passes the combined symbol part to a demodulator 226 to perform or finish demodulation of the combined symbol. For example, where the original symbol part was a DEQAM symbol and where the combining processor 225 performed demodulation according to QAM prior to combination, the demodulator 226 may revert the combined symbol part to non-differentially encoded data. Where the combining processor 225 fully demodulates the symbol part, the demodulator 226 may be omitted.

A decoder 230 receives the respective combined symbol portions from the communications devices 220 and decodes the data to produce data that can be interpreted and utilized by a higher level application, such as an ITS application. Various methods for encoding and decoding data for reception and transmission over the communications devices 220 will be apparent. In various embodiments, the decoder 230 may not be a separate component from the communications devices 220 and, instead, one or more of the communications devices 220 may include the decoder 230. In some such embodiments, the combined data symbol portions may be transmitted back to a "master" communications device for decoding. For example, the first communications device 220a may be designated as a master communications device for the system 200. As such, the second communications device 220b, after combining a portion of the received data symbol portion, sends the combined data symbol portion back to the master communications device such that the two (or more) portions can be decoded by a decoder implemented by the master communications device.

It will be understood that using this arrangement, the amount of memory used to implement the buffers 223 may be the memory used to store a full data symbol. In particular, where the respective buffers 223 exchange equal amounts of data with each other from the data symbol, the amount of memory space used at any given time is not increased beyond what would normally be used to store the full, undivided data symbol. Further, this method enables the distribution of processing requirements associated with symbol combination between multiple combining processors, thereby reducing the processing requirements for any one combining processor.

Figure 3:
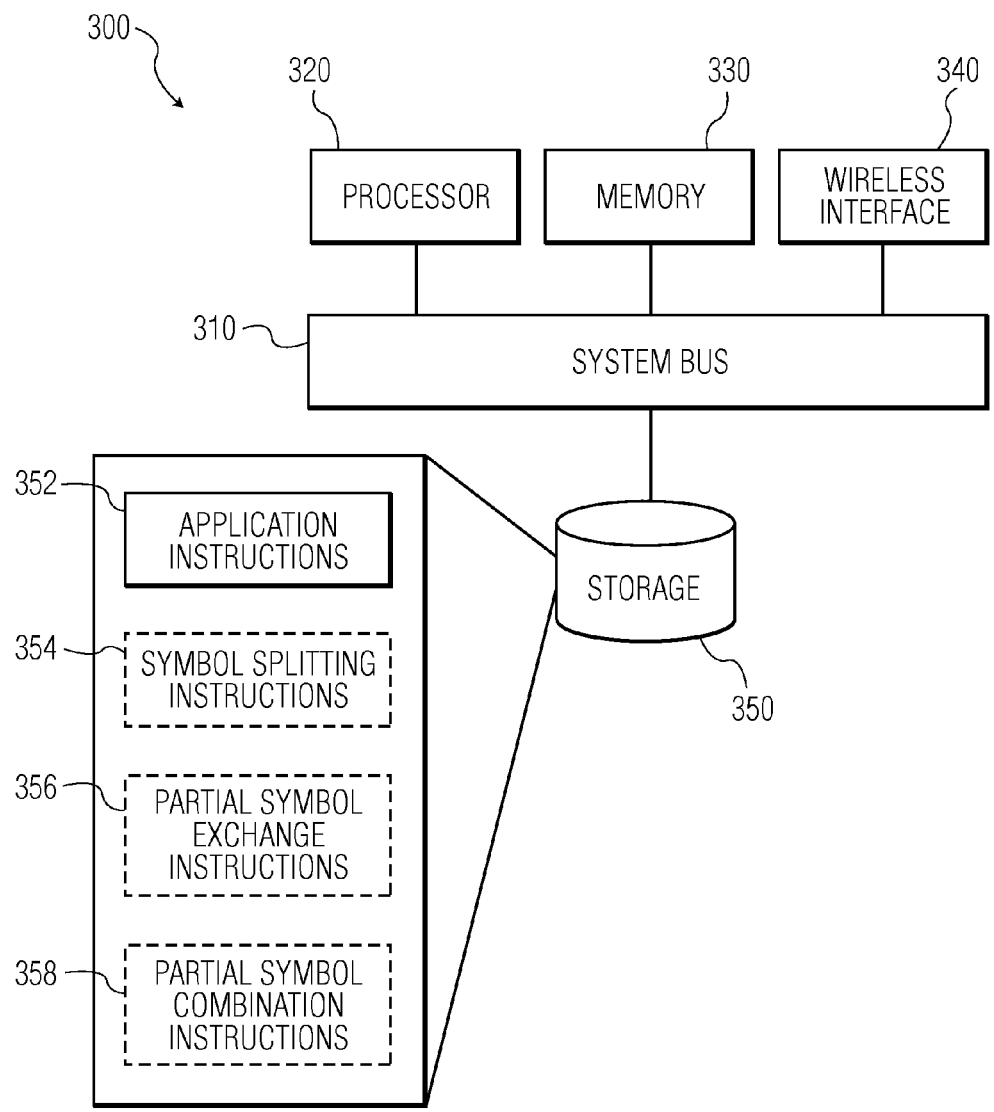
FIG. 3 illustrates a hardware diagram of an exemplary wireless communications device.

FIG. 3 illustrates a hardware diagram of an exemplary wireless communications device 300. The exemplary device 300 may correspond to the either of the communications devices of FIG. 2. As shown, the device 300 includes a processor 320, memory 330, wireless interface 340, and storage 350 interconnected via one or more system buses 310. It will be understood that FIG. 2 constitutes, in some respects, an abstraction and that the actual organization of the components of the device 300 may be more complex than illustrated.

The processor 320 may be any hardware device capable of executing instructions stored in the memory 330 or the storage 350. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The wireless interface 340 may include one or more devices for enabling communication with other hardware devices via a wireless communications medium. For example, the wireless interface 340 may include one or more antennas, reception circuitry capable of signal demodulation according to various schemes, transmission circuitry capable of signal modulation according to various schemes, and one or more protocol stacks. In some embodiments, the wireless interface 440 includes various components of the communications devices 220. Various alternative or additional hardware or configurations for the network interface 340 will be apparent.

The storage 350 may include one or more machine-readable storage media such as read-only memory (ROM), random-access memory (RAM), magnetic disk storage media, optical storage media, flash-memory devices, or similar storage media.

For example, where the hardware 300 implements an application controller (e.g., a controller to provide an ITS application), the storage 350 includes applications instructions for providing one or more applications to use the combined and decoded messages produced according to the methods and systems described herein. For example, the application instructions 354 may include instructions for implementing various features of an ITS. Where various functions related to data symbol split, exchange, and combining are implemented by a processor, the storage 350 also stores symbol splitting instructions 354, partial symbol exchange instructions 356, or partial symbol combination instructions 358, as appropriate. Thus, the combination of the partial symbol exchange instructions 356 and the processor 320 may constitute a swap component 224 of FIG. 2. Likewise, the combination of the partial symbol combination instructions 358 and the processor 320 may constitute a combining processor of FIG. 2. Alternatively, these components may be implemented as separate hardware components such as separate processors, FPGAs, ASICs, or other circuitry.

It will be apparent that various information described as stored in the storage 350 may be additionally or alternatively stored in the memory 330. In this respect, the memory 330 may also be considered to constitute a "storage device." Various other arrangements will be apparent. Further, the memory 330 and storage 350 may both be considered to be "non-transitory machine-readable media." As used herein, the term "non-transitory" will be understood to exclude transitory signals but to include all forms of storage, including both volatile and non-volatile memories.

While the device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein.

Figure 4:
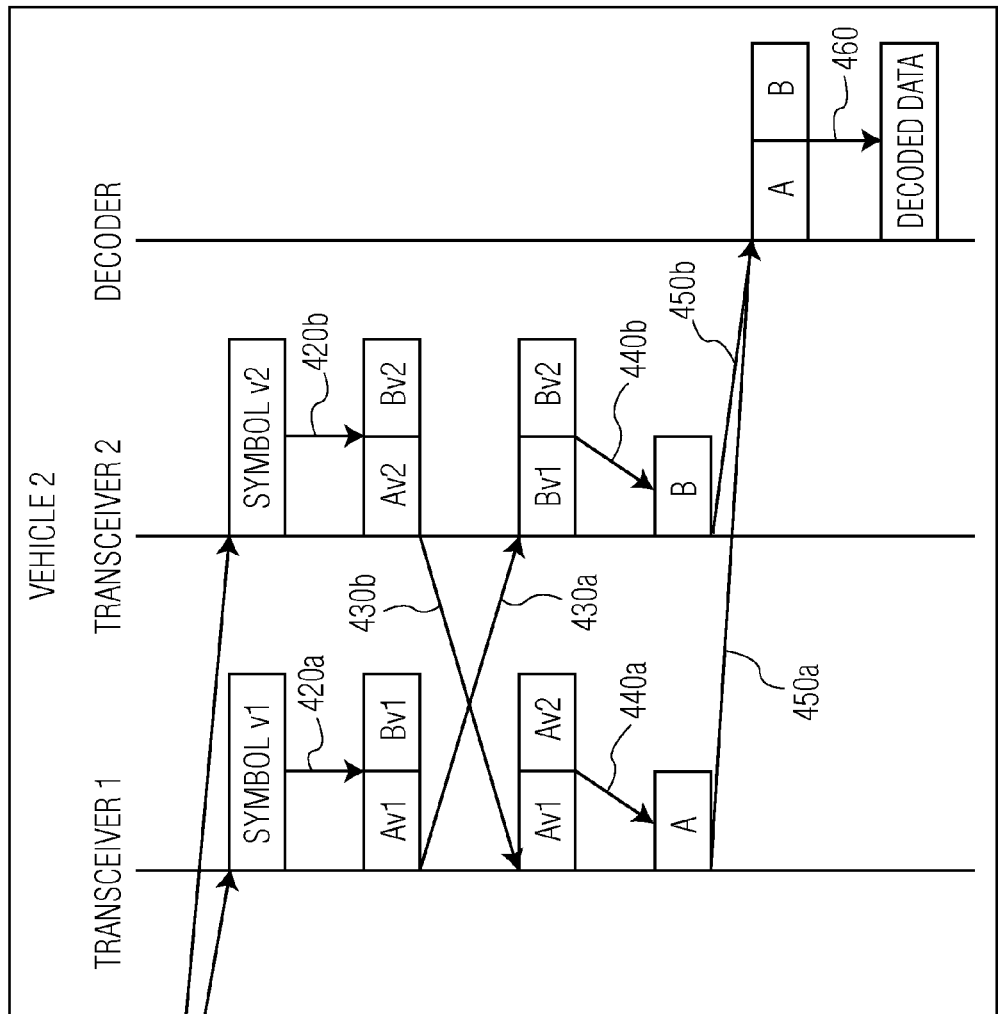
FIG. 4 illustrates an exemplary data flow for processing a received signal among multiple transceivers.
Figure 4:

FIG. 4 illustrates an exemplary data flow 400 for processing a received signal among multiple transceivers. For example, the data flow 400 may describe the message exchange illustrated in FIG. 1. Further, the second vehicle may implement a communications system such as the communications system 200 of FIG. 2. The data flow 400 begins when the first vehicle transmits 410 a data symbol, which is received by both transceivers on the second vehicle. Due to the different positions and conditions experience by the two transceivers, the transceivers receive slightly different "versions" of the transmitted message: transceiver 1 stores a symbol "v1" while transceiver 2 stores a symbol "v2." Using message combination, as will be described below, these two versions of the data symbol may be combined to provide a more accurate representation of the originally transmitted symbol.

Both transceivers then split 420 their respective versions of the symbol into multiple data symbol parts. As shown, transceiver 1 splits symbol v1 into data symbol parts Av1 and Bv1. Likewise, transceiver 2 splits symbol v2 into data symbol parts Av2 and Bv2. For example, the transceivers may divide the subcarriers within the data symbol into two equal groups, A and B. Various other methods for splitting a data symbol for parallel processing will be apparent.

After splitting the symbols, the transceivers exchange 430 a portion of the split symbol with each other according to a preprogrammed or otherwise agreed upon method. For example the transceivers may have previously exchanged control messages to agree that transceiver 1 will process "A" portions while transceiver 2 will process "B" portions. After the exchange, transceiver 1 stores two versions of the A portion: "Av1" and "Av2." Similarly, transceiver 2 stores two versions of the B portion: "Bv1" and "Bv2." It can be seen that, in embodiments where the A and B portions are equal size, the amount of memory used to store two A portions or two B portions after step 430 is the same as the amount of memory used to store the full symbol after reception and after splitting. As such, the methods described herein allow for data symbol combination without increasing the cost of the system Once the transceivers respectively store the appropriate two versions of the data symbol portions, the transceivers proceed to combine 440 the versions to create a combined data symbol portion. For example, the transceivers may perform maximum ratio combining to produce combined data symbol portions "A" and "B" respectively. The transceivers then each forward their respective portions to the decoder which reunites the symbol portions into a combined data symbol and decodes 460 the data symbol to produce decoded data, suitable for interpretation and use by an application implemented by a processor, such as a processor on one of the transceivers or another processor (not shown).

As noted above, various alternative embodiments may utilize additional antennas and transceivers. Various methods may be employed for extending the above-described functionalities to additional communications devices will be apparent. For example, the communications devices may be configured to split each received data symbol into a number of portions equal to the number of participating transceivers. Each such transceiver may then receive all such versions corresponding to a specific portion of the message that is assigned to that transceiver (e.g., transceiver 3 may receive all versions of data symbol portion "C") and combine the versions to produce the combined symbol portions which are then all provided to the decoder. As such, the symbols may be combined in a single stage. Such a single stage combination process may be beneficial where the various communications devices are in communication with each other according to a full mesh topology.

As another alternative, communications devices may combine symbol portions in multiple stages. For example, in an embodiment including four transceivers, each transceiver may split the received data symbol into two portions. Transceivers 1 and 2 may then cooperate to produce intermediate combined versions of symbol portions A and B in a manner similar to that shown in FIG. 4. Likewise, transceivers 3 and 4 may also cooperate to cooperate to produce intermediate combined versions of symbol portions A and B in a manner similar to that shown in FIG. 4. After this first stage of combining, transceivers 1 and 3 both store versions of intermediate portion A while transceivers 2 and 4 both store versions of intermediate portion B. During the second stage, transceiver 3 provides its intermediate portion A to transceiver 1 for further combination with the other intermediate portion A. Similarly, transceiver 4 provides its intermediate portion B to transceiver 2 for further combination with the other intermediate portion B. Finally, the fully combined portions A and B are provided to the decoder. This multi-stage combination process may be beneficial where the various communications devices are in communication with each other according to a line or ring topology.

According to another multi-stage processing method, each transceiver may end up with one fourth of the combined symbol. According to this embodiment, transceiver 1 and 2 first exchange symbol portions from their respective received messages and combine portions in a manner similar to that described with respect to FIG. 4. At the same time, transceivers 3 and 4 also exchange symbol portions from their respective received messages and combine portions in a manner similar to that described with respect to FIG. 4. At the end of stage one, each transceiver stored a combined intermediate symbol portion representing half of the full symbol. For stage two, transceivers 1 and 3 divide their half portions further and exchange the resultant portions for combination in a manner similar to that described with respect to FIG. 4. Likewise, transceivers 2 and 4 divide their half portions further and exchange the resultant portions for combination in a manner similar to that described with respect to FIG. 4. At the end of stage two, each transceiver includes a different fully combined quarter of the original symbol, which may then be provided to the decoder for recombination. Various modifications for extending the multi-stage process to different numbers of stages or communications devices will be apparent.

According to the foregoing, various embodiments reduce the cost associated with implementing cooperative radio diversity in a vehicle and other environments. In particular, by splitting and exchanging portions of received data symbols between transceivers, the memory and processing resources used to implement any single transceiver are reduced compared to a system wherein a single transceiver combines entire data symbols instead of portions thereof. Various additional benefits will be apparent in view of the foregoing.

Figure 5:
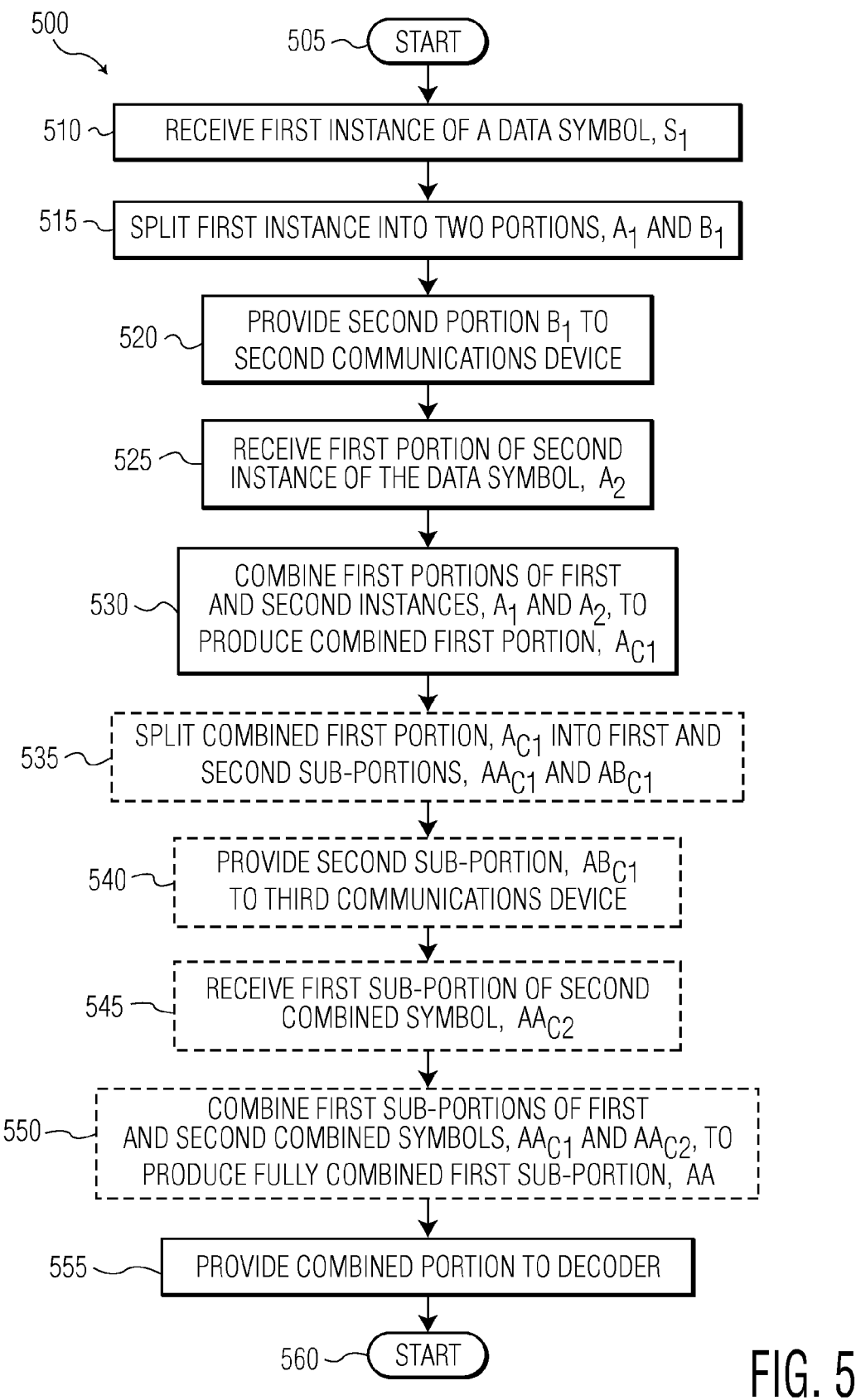
FIG. 5 illustrates an exemplary method for processing a received data symbol.

FIG. 5 illustrates an exemplary method 500 for processing a received data symbol. The method 500 may be performed by one or more transceivers (or other communications devices) operating according to the arrangements described herein. For example, for a vehicle implementing two transceivers that cooperate to perform data combining, both such transceivers may perform the method 500. Similarly, in a vehicle employing four transceivers, each such transceiver may each independently perform the method 500 to perform single- or multi-stage data combining, as will be described below.

As shown, the method 500 begins in step 505 and proceeds to step 510 where the transceiver performing the method 500 receives an instance of a data symbol, $S_1$. The transceiver then, in step 515, splits the data symbol $S_1$ into two portions, A, and $B_1$, according to, for example, the subcarriers within the data symbol $S_1$. Next, in step 520, the transceiver provides the second such portion, $B_1$, to a second transceiver to enable that second transceiver to perform data combination with regard to the second portion. In step 525, the transceiver receives a first portion from a second instance of the data symbol $A_2$ from the second transceiver.

It will be apparent that the steps 520, 525 may be performed in the reverse order from the order described or may be simultaneously performed with each other. It will further be apparent that modifications may be made to accommodate additional transceivers participating in the first (or only) stage of data combination. For example, step 515 may be modified to split the data symbol into as many equal portions as there are transceivers participating in the data combination. Steps 520 and 525 may be similarly modified to provide a different portions to each transceiver and to receive matching first portions from each transceiver.

After obtaining matching portions for combination, the method 500 proceeds to step 530 where the transceiver combines the portions, A, and $A_2$, according to any of the methods described above to produce a combined first portion, $A_{C1}$. In embodiments wherein the method 500 performs a single stage combination, the method may proceed directly to step 555 where the transceiver provides the combined first portion, $A_{C1}$ to the decoder (or other appropriate device such as an application processor, another transceiver, or a component of the transceiver performing the method). The method then proceeds to end in step 560.

If, on the other hand, the method 500 implements a multi-stage combination process, the method proceeds from step 530 to step 535 where the transceiver further splits the combined first portion $A_{C1}$ into two (or more) sub-portions, $AA_{C1}$ and $AB_{C1}$. Then, in steps 540 and 545, the transceiver swaps the second sub-portion of the first combined symbol, $AB_{C1}$, with a third transceiver for a first sub-portion of a second combined symbol, $AA_{C2}$. It will be apparent that additional transceivers may be involved in steps 540, 545 in a manner similar to that explained above with respect to steps 520, 525.

Next, in step 550, the transceiver combines the two (or more) sub-portions, $AA_{C1}$ and $AA_{C2}$, to produce a fully combined sub-portion, AA. The transceiver then provides this sub-portion, AA, to the decoder (or other appropriate device such as an application processor, another transceiver, or a component of the transceiver performing the method) for reunification with the other sub-portions. The method 500 then proceeds to end in step 560 It will be apparent that the method 500 may be extended to virtually any number of stages by adding additional steps of further splitting combined sub-portions, swapping the new sub-portions with other transceivers, and then combining the sub-portions.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A communications device comprising:
   a first antenna group comprising at least one antenna;
   a first receiver circuit configured to receive a first instance of a data symbol via the first antenna group;
   a first swap component of the first communications device configured to:
      receive a first portion of a second instance of the data symbol from a second communications device, provide a second portion of the first instance of the data symbol to the second communications device; and a first buffer configured to store a first portion of the first instance of the data symbol and the first portion of the second instance of the data symbol; and a first combining processor configured to create a first portion of a combined symbol by combining the first portion of the first instance of the data symbol and the first portion of the second instance of the data symbol.

2. The communications device of claim 1, wherein the swap component comprises:

a transmitter circuit configured to transmit the second portion of the first instance of the data symbol via the first antenna group, and the first receiver circuit, wherein the first receiver circuit is configured to receive the first portion of a second instance of the data symbol via the first antenna group.

3. The communications device of claim 1, wherein the swap component comprises a wired connection to the second communications device.

4. The communications device of claim 1, wherein the data symbol is an orthogonal frequency division multiplexing (OFDM) symbol.

5. The communications device of claim 1, wherein:

the first swap component is further configured to:

provide a third portion of the first instance of the data symbol to a third communications device, and receive a first portion of a third instance of the data symbol from the third communications device;

the first buffer is further configured to store the first portion of the third instance of the data symbol; and in creating the first portion of a combined symbol, the first combining processor is configured to combine the first portion of the first instance of the data symbol, the first portion of the second instance of the data symbol, and the first portion of the third instance of the data symbol.

6. The communications device of claim 1, wherein:

the first portion of the first instance of the data symbol comprises at least a first subcarrier of the first instance of the data symbol, the second portion of the first instance of the data symbol comprises at least a second subcarrier of the first instance of the data symbol, the first portion of the second instance of the data symbol comprises at least a first subcarrier of the second instance of the data symbol, and the second portion of the second instance of the data symbol comprises at least a second subcarrier of the second instance of the data symbol.

7. The communications device of claim 1, wherein the combining processor is further configured to transmit a control message to the second communications device, wherein the control message indicates that the communications device will transmit the first portion of the first instance of the data symbol to the second communications device and will process the second portion of the first instance of the data symbol.

8. The communications device of claim 1, wherein the swap component is further configured to receive a second portion of the combined symbol from the second communications device, the communications device further comprising:

a decoder configured to decode the first and second portions of the combined symbol.

9. A communications system comprising:

the communications device of claim 1; and the second communications device, wherein the second communications device comprises:

a second antenna group comprising at least one antenna;

a second receiver circuit configured to receive the instance of the data symbol via the second antenna group;

a second swap component configured to:

provide the first portion of the second instance of the data symbol to the communications device, and receive the second portion of a first instance of the data symbol from the communications device;

a second buffer configured to store a second portion of the second instance of the data symbol and the second portion of the first instance of the data symbol; and a second combining processor configured to create a second portion of the combined symbol by combining the second portion of the first instance of the data symbol and the second portion of the second instance of the data symbol.

10. The communications system of claim 9, further comprising a third communications device configured to receive a third instance of the data symbol and a fourth communications device configured to receive a fourth instance of the data symbol, wherein:

the first portion of the combined symbol is a first portion of a first intermediate combined symbol, wherein the first portion of the first intermediate combined symbol includes a first sub-portion of the first intermediate combined symbol and a second sub-portion of the first intermediate combined symbol;

the second portion of the combined symbol is a second portion of the first intermediate combined symbol wherein the second portion of the first intermediate combined symbol includes a third sub-portion of the first intermediate combined symbol and a fourth sub-portion of the first intermediate combined symbol;

the first swap component of the first communications device is further configured to:

provide the second sub-portion of the first intermediate combined symbol to the third communications device, and receive a first sub-portion of a second intermediate combined symbol from the third communications device;

the second swap component of the second communications device is further configured to:

provide the fourth sub-portion of the first intermediate combined symbol to the fourth communications device, and receive a third sub-portion of the second intermediate combined symbol from the fourth communications device;

the first combining processor is further configured to create a first sub-portion of a fully combined symbol by combining the first sub-portion of the first intermediate combined symbol and the first sub-portion of the second intermediate combined symbol; and the second combining processor is further configured to create a third sub-portion of the fully combined symbol by combining the third sub-portion of the first intermediate combined symbol and the third sub-portion of the second intermediate combined symbol.

11. A non-transitory machine-readable storage medium encoded with instructions for execution by a first communications device for receiving a wireless signal, the method comprising:

instructions for receiving, at the first communications device via a wireless communication medium, a first instance of a data symbol, the first instance including a first portion and a second portion;

instructions for providing, by the first communications device to a second communications device, the second portion of the first instance;

instructions for receiving, by the first communications device from the second communications device, a first portion of a second instance of the data symbol;

instructions for combining the first portion of the first instance with the first portion of the second instance to create a first portion of a combined symbol.

12. The non-transitory machine-readable storage medium of claim 11, wherein the instructions for receiving and providing comprise instructions for receiving and providing via the wireless communication medium.

13. The non-transitory machine-readable storage medium of claim 11, wherein the instructions for receiving and providing comprise instructions for receiving and providing via a wired connection to the second communications device.

14. The non-transitory machine-readable storage medium of claim 11, wherein the data symbol is an orthogonal frequency division multiplexing (OFDM) symbol.

15. The non-transitory machine-readable storage medium of claim 11, further comprising:

instructions for providing, by the first communications device to a third communications device, a third portion of the first instance;

instructions for receiving, at the first communications device from the third communications device, a first portion of a third instance of the data symbol;

wherein the instructions for combining the first portion of the first instance with the first portion of the second instance to create a first portion of a combined symbol comprise instructions for combining the first portion of the first instance, the first portion of the second instance, and the first portion of the third instance.

16. The non-transitory machine-readable storage medium of claim 11, wherein, the first portion of the first instance of the data symbol comprises at least a first subcarrier of the first instance of the data symbol, the second portion of the first instance of the data symbol comprises at least a second subcarrier of the first instance of the data symbol, the first portion of the second instance of the data symbol comprises at least a first subcarrier of the second instance of the data symbol, and the second portion of the second instance of the data symbol comprises at least a second subcarrier of the second instance of the data symbol.

17. The non-transitory machine-readable storage medium of claim 11, further comprising:

instructions for transmitting, by the first communications device to the second communications device, a control message that indicates that the first communications device will transmit the first portion of the first instance of the data symbol to the second communications device and will process the second portion of the first instance of the data symbol.

18. The non-transitory machine-readable storage medium of claim 11, further comprising:

instructions for receiving, by the first communications device from the second communications device, a second portion of the combined symbol from the second communications device; and instructions for decoding the first and second portions of the combined symbol.

19. A method for receiving a wireless signal, the method comprising:

receiving, at a first communications device via a wireless communication medium, a first instance of a data symbol, the first instance including a first portion and a second portion;

providing, by the first communications device to a second communications device, the second portion of the first instance;

receiving, by the first communications device from the second communications device, a first portion of a second instance of the data symbol;

combining the first portion of the first instance with the first portion of the second instance to create a first portion of a combined symbol.

20. The method of claim 19, wherein the first portion of the first instance of the data symbol comprises at least a first subcarrier of the first instance of the data symbol, the second portion of the first instance of the data symbol comprises at least a second subcarrier of the first instance of the data symbol, the first portion of the second instance of the data symbol comprises at least a first subcarrier of the second instance of the data symbol, and the second portion of the second instance of the data symbol comprises at least a second subcarrier of the second instance of the data symbol.

* * * * *